(12) United States Patent
Pelfrey

(10) Patent No.: US 11,376,699 B2
(45) Date of Patent: Jul. 5, 2022

(54) EXPANDABLE LOCATING PIN

(71) Applicants: MAGNA INTERNATIONAL INC., Aurora, CA (US); Shelby Dean Pelfrey, Clinton, TN (US)

(72) Inventor: Shelby Dean Pelfrey, Clinton, TN (US)

(73) Assignee: MAGNA INTERNATIONAL INC., Aurora (CA)

(*) Notice: Subject to any disclaimer, the term of this patent is extended or adjusted under 35 U.S.C. 154(b) by 131 days.

(21) Appl. No.: 16/489,892

(22) PCT Filed: Mar. 2, 2018

(86) PCT No.: PCT/US2018/020736
§ 371 (c)(1),
(2) Date: Aug. 29, 2019

(87) PCT Pub. No.: WO2018/161012
PCT Pub. Date: Sep. 7, 2018

(65) Prior Publication Data
US 2020/0030927 A1 Jan. 30, 2020

Related U.S. Application Data

(60) Provisional application No. 62/466,016, filed on Mar. 2, 2017.

(51) Int. Cl.
*B23Q 3/00* (2006.01)
*B23Q 3/06* (2006.01)
(Continued)

(52) U.S. Cl.
CPC ............ *B23Q 3/062* (2013.01); *B23Q 3/061* (2013.01); *F16B 5/065* (2013.01);
(Continued)

(58) Field of Classification Search
CPC . B23Q 3/00; B23Q 3/062; B23Q 3/06; B23Q 3/04; B23Q 3/068; B23Q 3/152;
(Continued)

(56) References Cited

U.S. PATENT DOCUMENTS

| 4,500,079 A | 2/1985 | Morghen |
| 5,516,089 A | 5/1996 | Seniff et al. |

(Continued)

FOREIGN PATENT DOCUMENTS

| DE | 102016015041 A1 | 12/2017 |
| WO | 2016020028 A1 | 2/2016 |

OTHER PUBLICATIONS

"Welker Expanding Locating Pin" (Welker Eng) Nov. 19, 2013; retrieved from internet Apr. 26, 2018; <URL=https://www.youtube.com/watch?time_continue=1&v=5M_s03n0-eQ>; entire document (first cited in PCT ISR).

*Primary Examiner* — Lee D Wilson
(74) *Attorney, Agent, or Firm* — Dickinson Wright PLLC

(57) ABSTRACT

A locating pin for positioning one or more workpieces on a mounting member is provided. The locating pin includes at least one cam being radially moveable between an extended position and a retracted position. The at least one cam engages the workpiece while in the extended position to hold the workpiece in place. The at least one cam is spaced from the workpiece while in the retracted position to allow the workpiece to be positioned on, or removed from the locating pin.

14 Claims, 9 Drawing Sheets

(51) Int. Cl.
*F16B 5/06* (2006.01)
*F16B 13/08* (2006.01)
*F16B 19/10* (2006.01)

(52) U.S. Cl.
CPC ........ F16B 13/0891 (2013.01); F16B 19/109 (2013.01); *B23Q 2240/002* (2013.01)

(58) Field of Classification Search
CPC .... B25B 3/00; B25B 5/00; B25B 5/02; B25B 5/04
See application file for complete search history.

(56) References Cited

U.S. PATENT DOCUMENTS

| | | |
|---|---|---|
| 5,722,648 A | 3/1998 | Groll et al. |
| 6,378,855 B1 | 4/2002 | Sawdon et al. |
| 6,913,254 B2 | 7/2005 | Pavlik et al. |
| 9,770,810 B2 * | 9/2017 | Schauss ................ B25B 5/061 |
| 2004/0070130 A1 | 4/2004 | Pavlik et al. |
| 2006/0125167 A1 * | 6/2006 | Steele ..................... B25B 5/16 269/32 |
| 2008/0315478 A1 | 12/2008 | McIntosh |
| 2014/0056668 A1 | 2/2014 | Demmeler |
| 2020/0030927 A1 * | 1/2020 | Pelfrey ................ B23Q 3/062 |

* cited by examiner

EXPANDABLE LOCATING PIN

CROSS REFERENCE TO RELATED APPLICATIONS

This U.S. National Stage Patent Application claims the benefit of PCT International Patent Application Serial No. PCT/US2018/020736 filed Mar. 2, 2018 entitled "Expandable Locating Pin" which claims the benefit of U.S. Provisional Patent Application Ser. No. 62/466,016 entitled "Expandable Locating Pin," filed Mar. 2, 2017, the entire disclosures of the applications being considered part of the disclosure of this application, and hereby incorporated by reference.

BACKGROUND OF THE INVENTION

1. Field of the Invention

A locating pin for positioning one or more workpieces on a mounting member. More particularly, a locating pin having cam members that are moveable between an extended position for holding the workpieces in place, and a retracted position which allows the workpieces to be positioned on, or removed from the locating pin.

2. Description of the Prior Art

In manufacturing scenarios in which a number of substantially identical workpieces are to be subjected to work procedures that are common to all of the workpieces, it is known to provide the workpieces with identically positioned pilot holes. The pilot holes are arranged for receiving one or more locating pins that are arranged on a mounting member, e.g., a jig, for locating the workpiece in a predetermined position relative to the mounting member. This arrangement allows the workpieces to be quickly placed onto and removed from the mounting member while also assuring an accurate placement of the workpieces for upcoming manufacturing operations.

An issue with conventional locating pins is that there is typically a gap provided between the locating pin and the pilot hole, thus allowing a certain amount of shifting of workpieces relative to one another. This can use up a relatively large amount of the assembly tolerances available in the manufacturing operation. Accordingly, there remains a need for improvements to locating pins.

SUMMARY OF THE INVENTION

According to an aspect of the disclosure, a locating pin for positioning one or more workpieces on a mounting member is provided. The locating pin includes at least one cam being radially moveable between an extended position and a retracted position. The at least one cam engages the workpiece while in the extended position to hold the workpiece in place, and the at least one cam is spaced from the workpiece while in the retracted position to allow the workpiece to be positioned on, or removed from the locating pin.

According to another aspect of the disclosure, a locating pin for positioning workpieces on a mounting member is provided. The locating pin has a central body that extends axially between a base region, an intermediate region and a head region. The head region tapers inwardly to a tip for being received by a hole in the workpiece. A channel is defined by the central body and extends axially through the base region, the intermediate region and the head region and terminates prior to the tip. The intermediate region defines a pair of openings into the channel on circumferentially opposite sides of one another. A driver is slidingly received by the channel of the central body. The driver extends axially between a bottom flange and a wedge portion. A pair of cams are each positioned in one of the openings of the central body for being biased outwardly into an extended portion by the wedge portion during axial movement of the driver such that the cams extend radially outwardly into engagement with the workpieces for securing the locating pin to the workpieces.

According to these and other aspects of the disclosure, the locating pin is capable of substantially eliminating the gap between the locating pin and pilot hole when the at least one cam is positioned in the extended position. As such, the subject invention eliminates true position alignment stack up when multiple workpieces that have pilot holes of the same size are positioned on the same locating pin because the engagement of the at least one cam against the workpieces fills the gap and thus forces the workpieces into alignment with one another.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
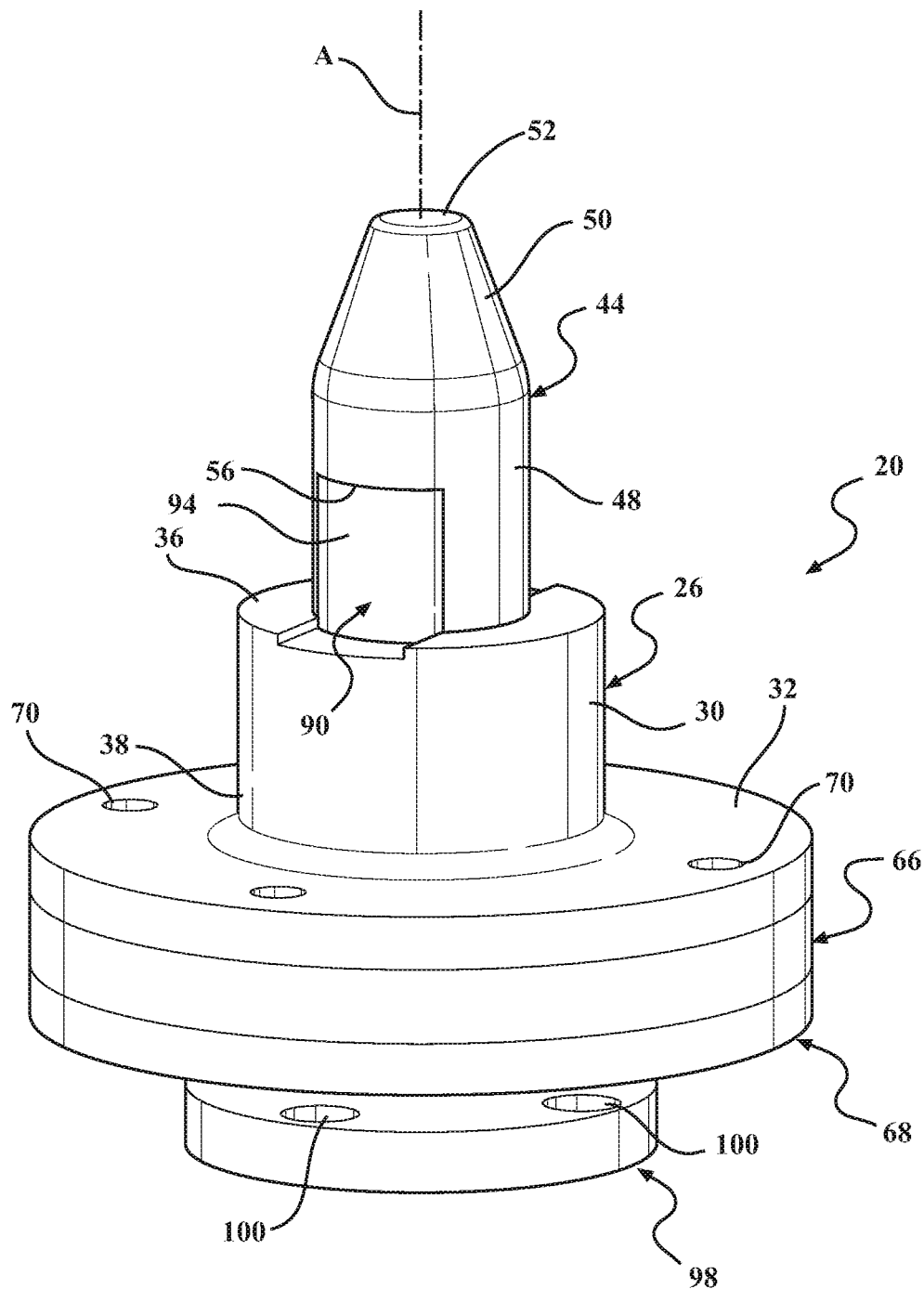
FIG. 1 is a perspective view of an example embodiment of a locating pin according to an aspect of the subject disclosure.
Figure 2:
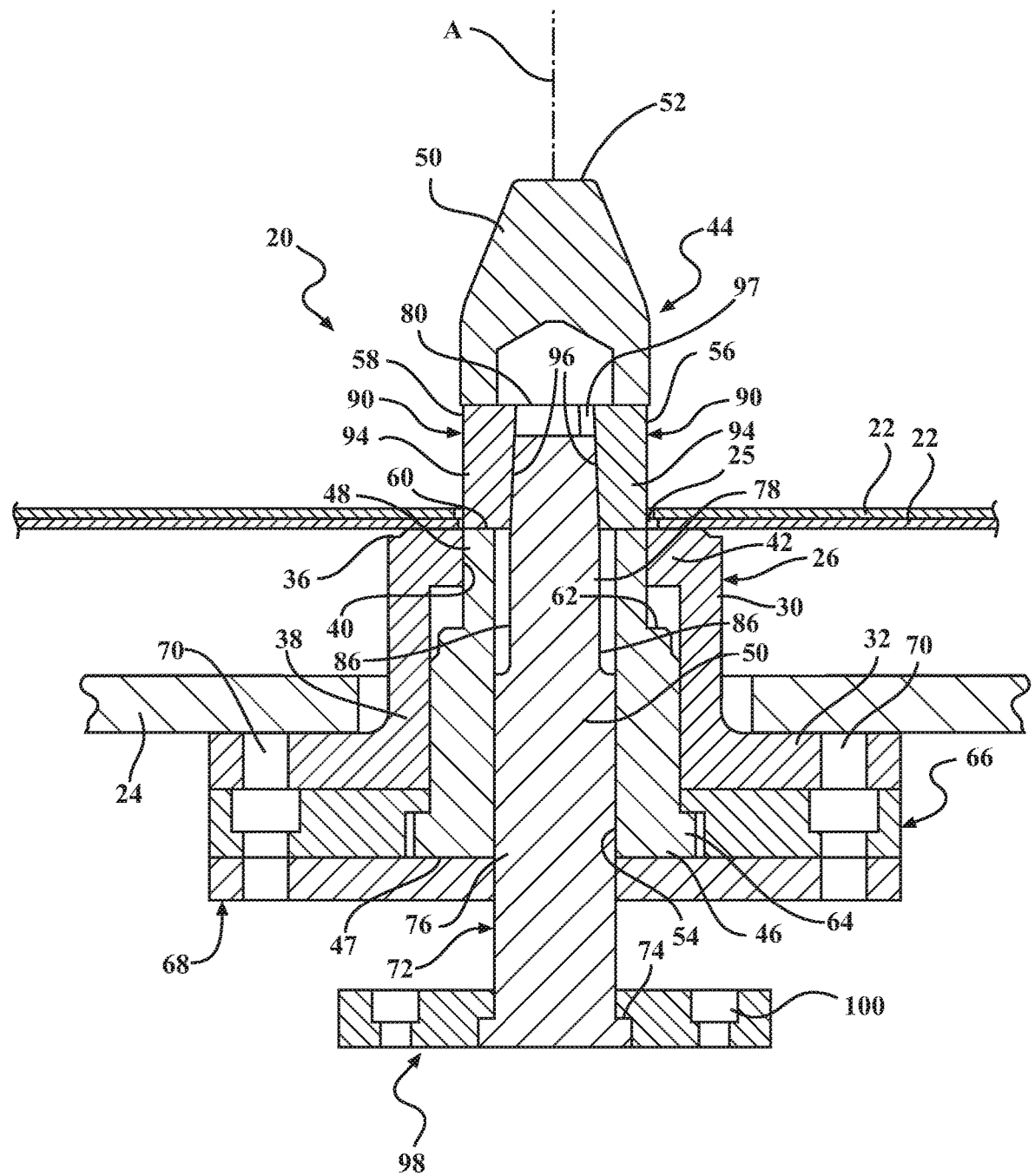
FIG. 2 is a side cross-sectional view of the locating pin of FIG. 1 with a pair of cams in a retracted position.
Figure 3:
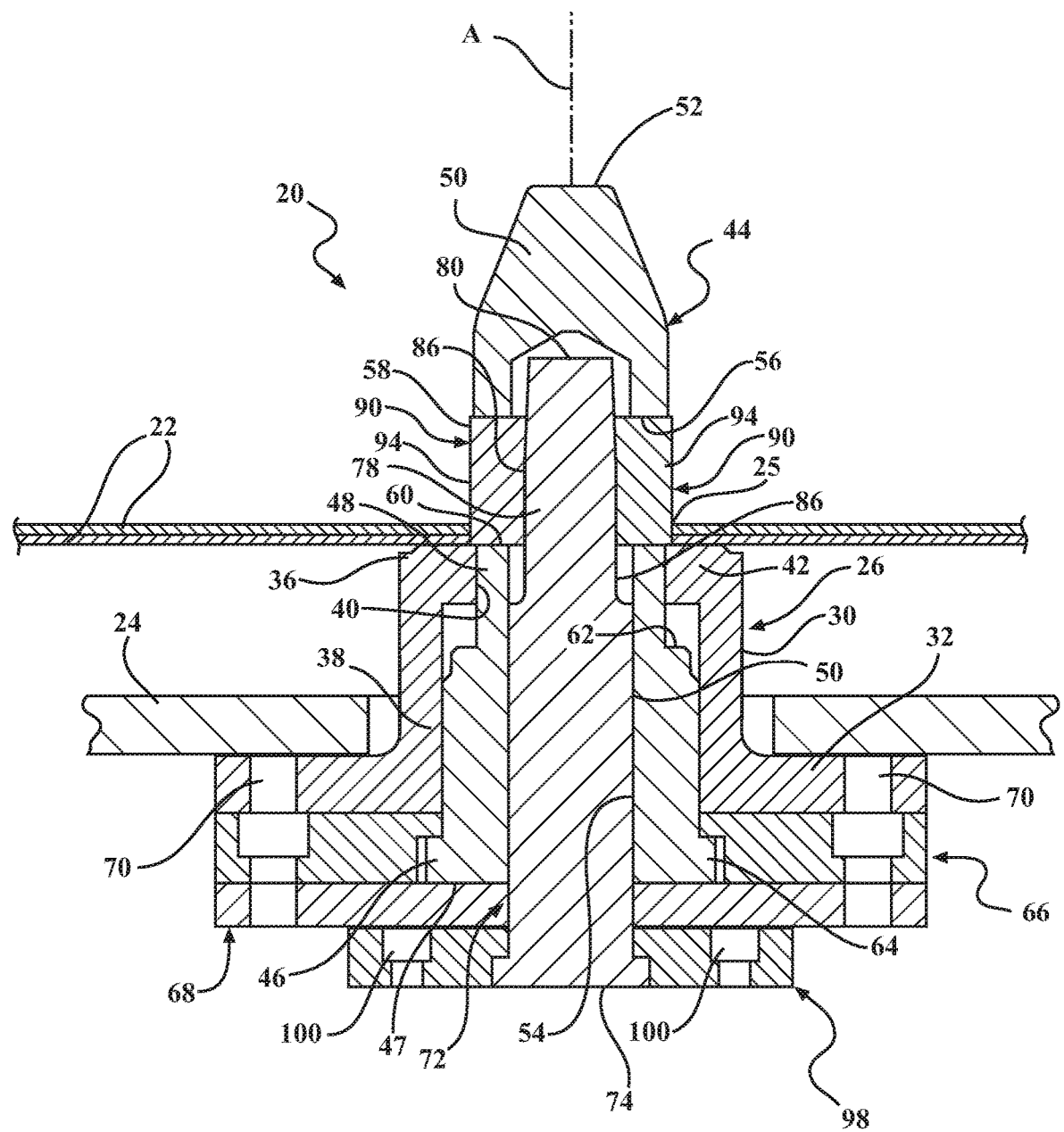
FIG. 3 is a side cross-sectional view of the locating pin of FIG. 1 with the cams in an extended position and engaging a pair of workpieces.
Figure 4:
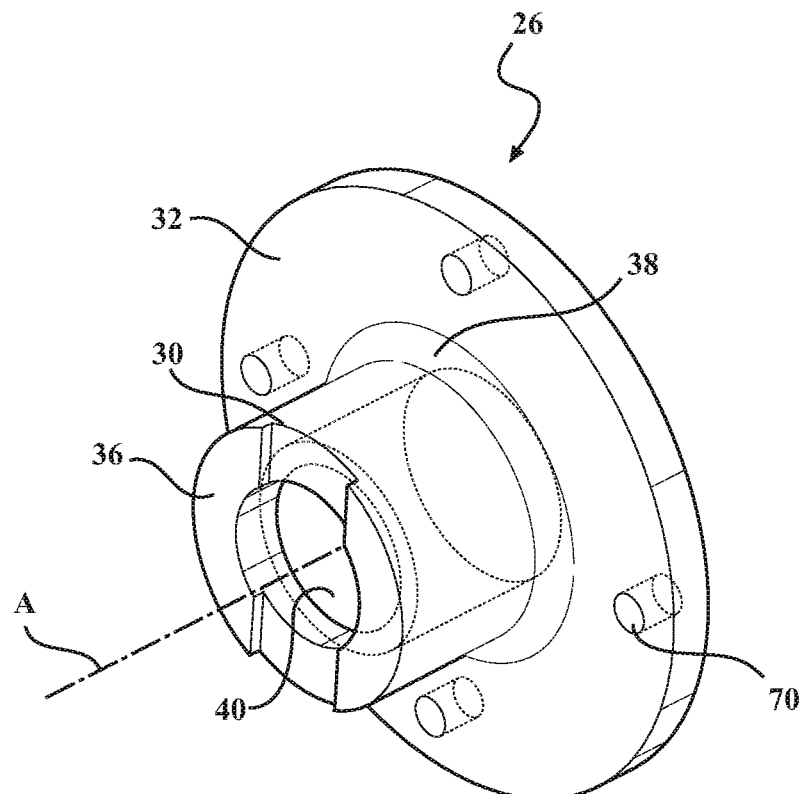
FIG. 4 is a perspective view of an example embodiment of a net member of a locating pin according to an aspect of the subject disclosure.

Referring to the Figures, wherein like numerals indicate corresponding parts throughout the several views, a locating pin 20 is generally shown for anchoring one or more workpieces to a mounting member, e.g., a jig, to hold the workpiece in a predetermined positon while manufacturing operations are performed on the workpiece. More particularly, as best illustrated in FIGS. 2-3, the subject locating pin 20 is configured to be secured to the mounting member 24 and received by a pilot hole 25 on each of the workpieces 22. The workpieces 22 are secured in place in a predetermined orientation and location when the workpieces 22 are attached to a plurality of the subject locating pins 20 to allow upcoming manufacturing operations to be performed on the workpieces 22.

As best illustrated in FIGS. 1-4, the locating pin 20 includes a net member 26 that extends about and along an axis A and has a shaft portion 30 and an outer flange portion 32. The shaft portion 30 generally has a tube shape and extends axially between a first end 36 and a second end 38. The outer flange portion 32 extends radially outwardly from the shaft portion 30 at the second end 38. The shaft portion 30 further defines a hollow 40 that extends axially therethrough. An annular seat 42 extends radially inwardly into the hollow 40 at the first end 36 of the shaft portion 30.

Figure 5:
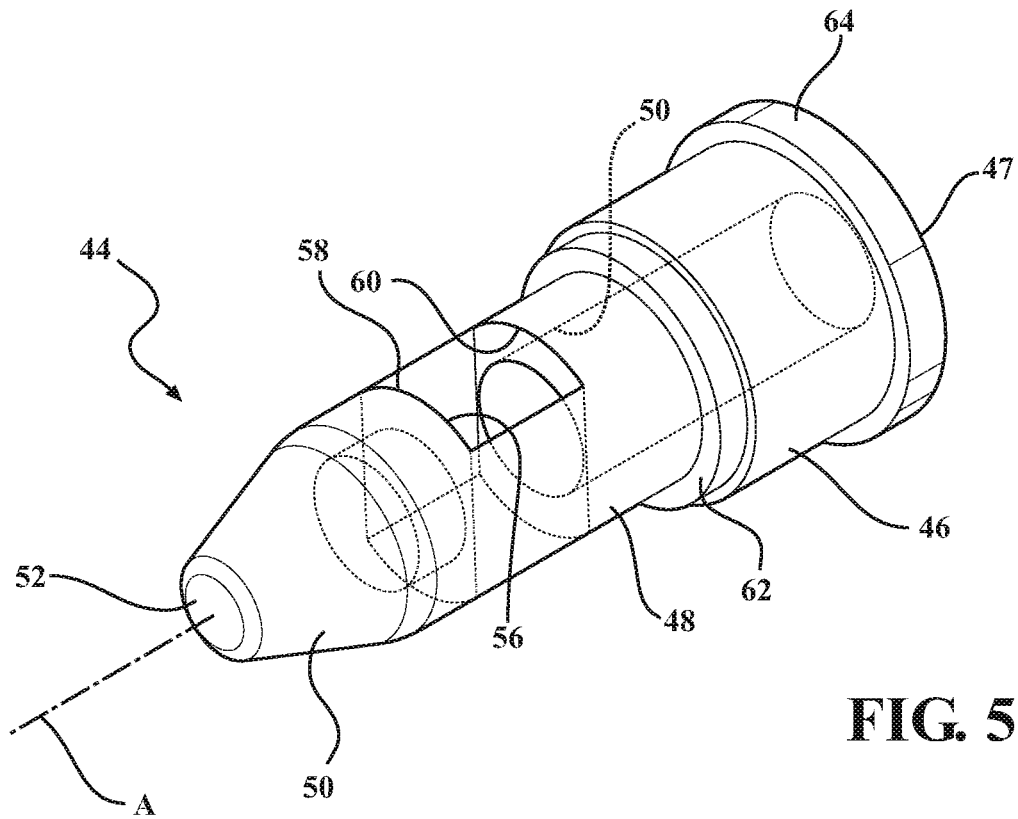
FIG. 5 is a perspective view of an example embodiment of a central body of a locating pin according to an aspect of the subject disclosure.
Figure 6:
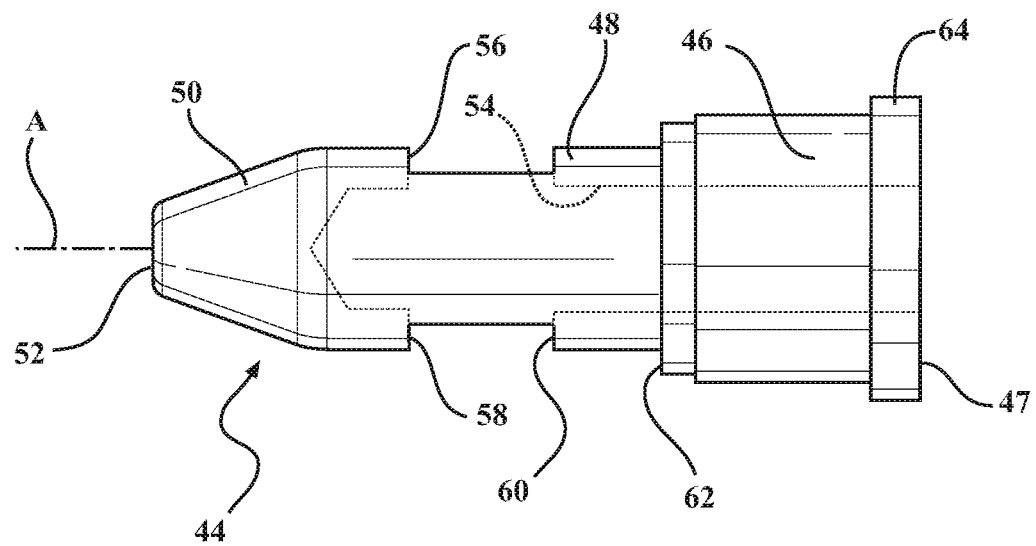
FIG. 6 is a side view of the central body of FIG. 5.

As best presented in FIGS. 2 and 3, a central body 44 is axially received by the hollow 40. As best illustrated in FIGS. 5-6, the central body 44 extends axially between a base region 46, an intermediate region 48 and a head region 50. The head region 50 has a frustoconical shape and terminates axially at a tip 52. The frustoconical shape of the head allows the head region 50 to be guided into the pilot holes of the workpiece(s) 22. The central body 44 defines a channel 54 that extends axially through the base region 46, the intermediate region 48 and terminates prior to the tip 52 in the head region 50. The intermediate region 48 extends axially from the head region 50 in a generally tube shape 34. The intermediate region 48 defines a pair of openings 56 into the channel 54 on circumferentially opposite sides of the intermediate region 48. It should be appreciated that any number of openings 56 could be utilized. Each of the openings 56 extends axially between an upper end 58 and a lower end 60. As best illustrated in FIGS. 2 and 3, the lower end 60 of the openings 56 is approximately axially aligned with the annular seat 42 of the net member 26. The base region 46 extends axially from the intermediate region 48 in a cylindrical shape and terminates at a second end 47. The base region 46 has a larger outer diameter than the outer diameter of the intermediate region 48. A step 62 is defined at the interface of the base region 46 and the intermediate region 48. The base region 46 has an inner flange 64 that extends radially outwardly at the second end 47.

Figure 7:
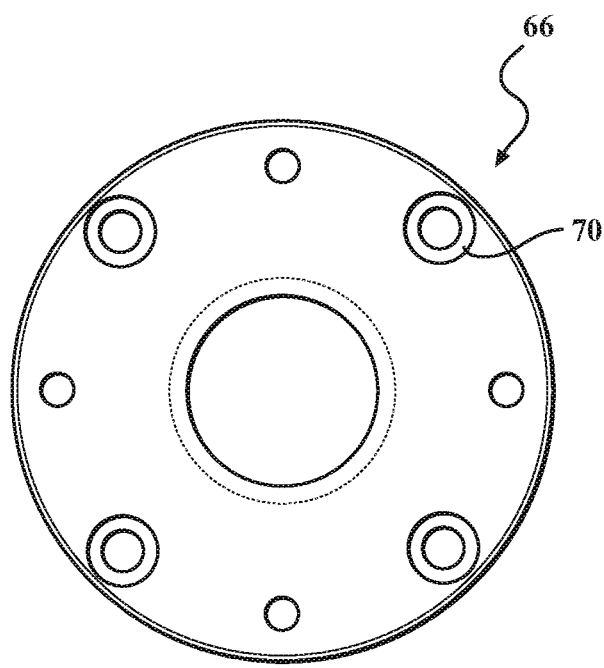
FIG. 7 is a front transparent view of an example embodiment of a body retainer of a locating pin according to an aspect of the subject disclosure.
Figure 8:
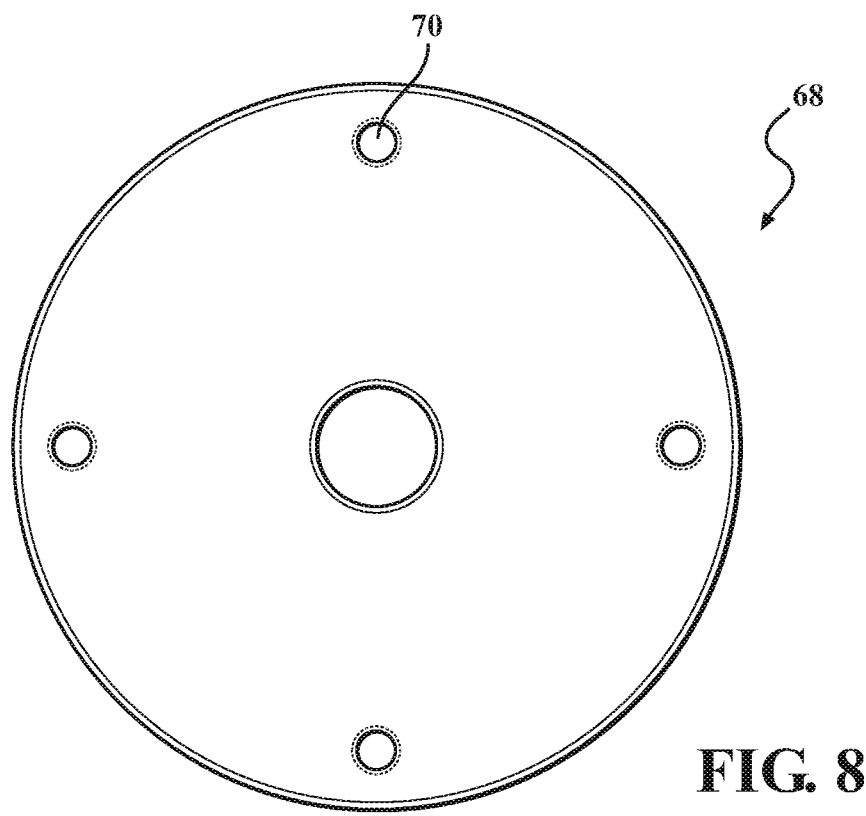
FIG. 8 is a front transparent view of an example embodiment of a backing plate of a locating pin according to an aspect of the subject disclosure.

As best illustrated in FIGS. 2-3 and 7, a generally washer-shaped body retainer 66 underlies the outer flange portion 32 and is disposed circumferentially about the inner flange 64 for holding the central body 28 in place. As best illustrated in FIGS. 2-3 and 8, a generally washer-shaped backing plate 68 underlies the body retainer 66. The outer flange portion 32, the body retainer 66 and the backing plate 68 together define a plurality of securement passages 70 that extend axially therethrough each for receiving a fastener for securing the outer flange portion 32, the body retainer 66 and the backing plate 68 to one another and for securing the locating pin 20 to the mounting member 24.

Figure 9:
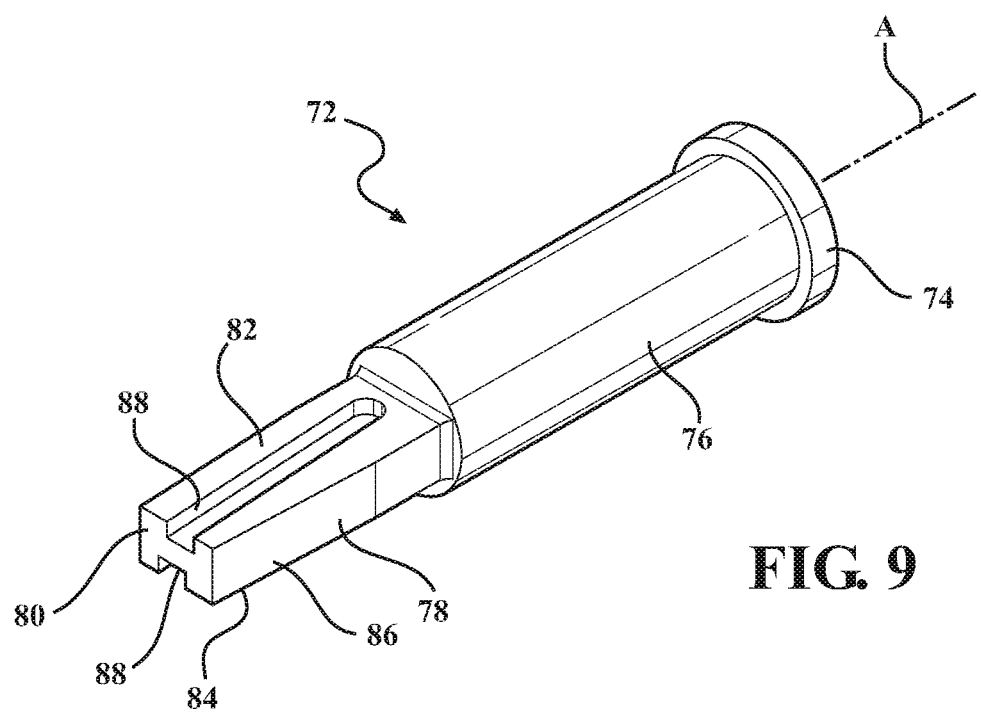
FIG. 9 is a perspective view of an example embodiment of a driver of a locating pin according to an aspect of the subject disclosure.

As best illustrated in FIGS. 2-3 and 9, a driver 72 is moveably received by the channel 54 of the central body 44. The driver 72 extends axially between a bottom flange 74, a cylinder 76, and a wedge 78. The bottom flange 74 extends radially outwardly from the cylinder 76. The wedge 78 extends axially from the cylinder 76 and terminates at an end face 80. The wedge 78 further has an upper face 82 and a lower face 84 positioned in parallel relationship with one another, and a pair of side faces 86 between the upper and lower faces 82, 84. The side faces 86 tapers inwardly as they extend axially to the end face 80. The upper and lower faces 82, 84 each define a slot 88 that extends axially away from the end face 80.

Figure 10:
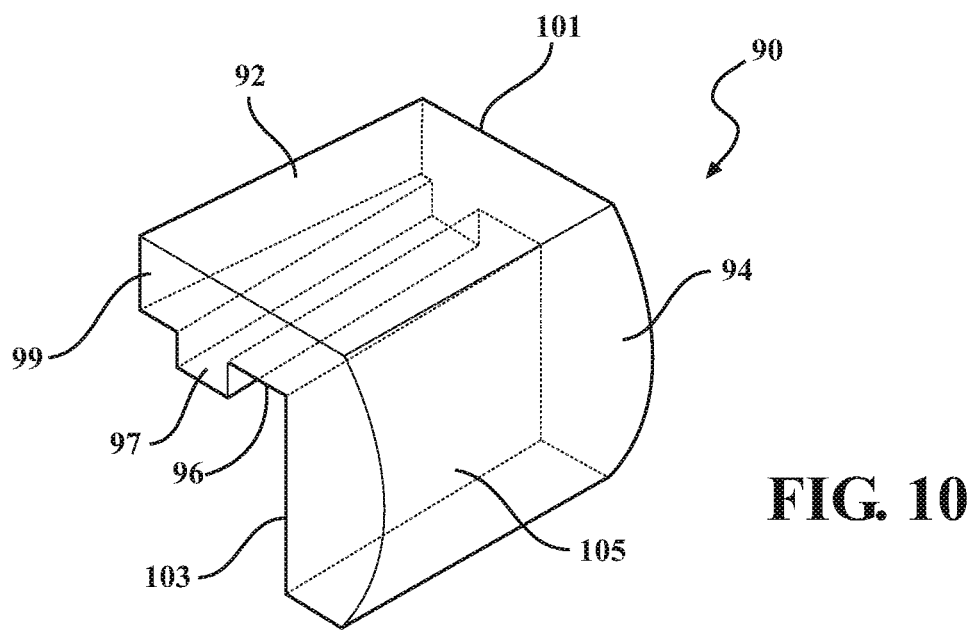
FIG. 10 is a perspective transparent view of an example embodiment of a cam of a locating pin according to an aspect of the subject disclosure.
Figure 11:
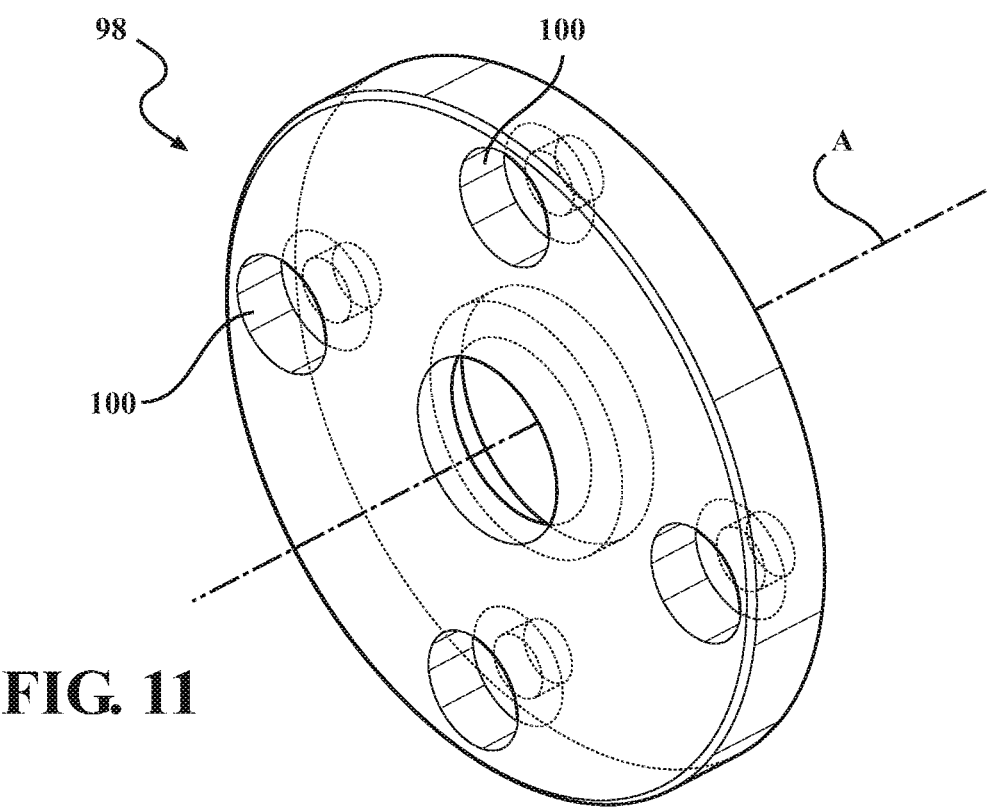
FIG. 11 is a perspective transparent view of a driver retainer of a locating pin according to an aspect of the subject disclosure.
Figure 12:
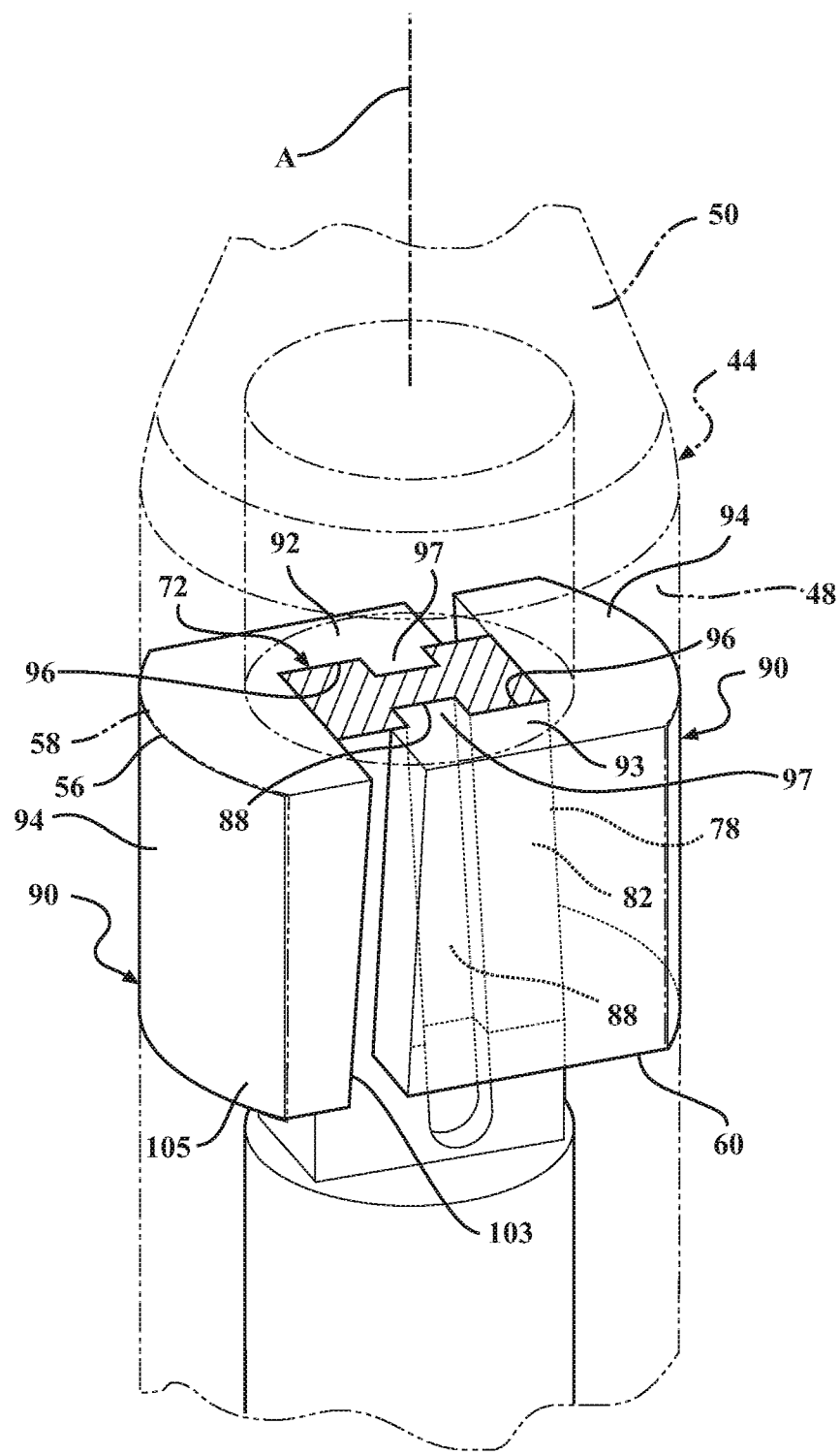
FIG. 12 is a perspective transparent view of an example embodiment of a central body, a driver and cams of a locating pin, with the cams positioned in a retracted position.
Figure 13:
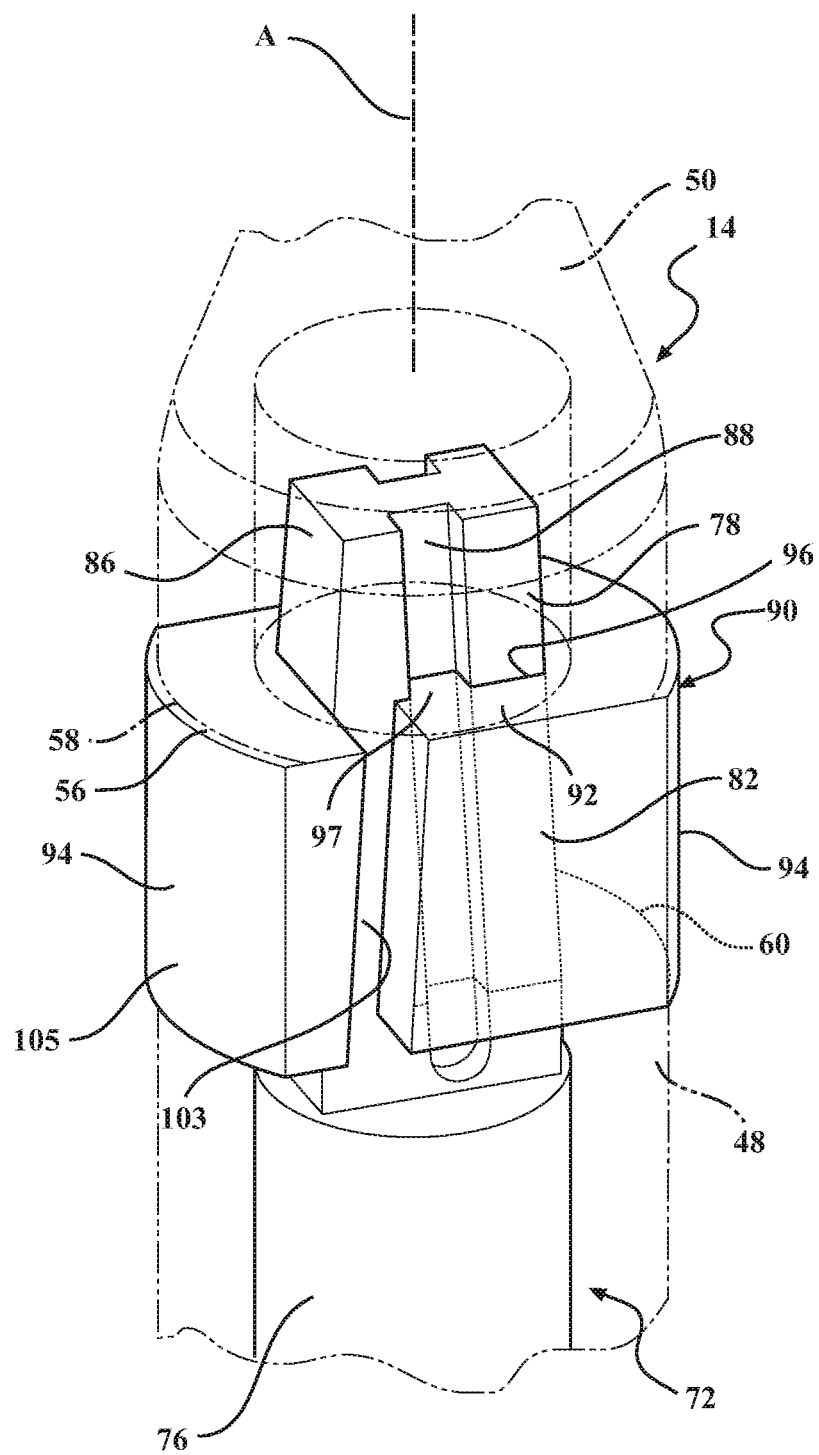
FIG. 13 is a perspective transparent view of the central body, a driver and cams of a locating pin of FIG. 12, with the cams positioned in an extended position according to an aspect of the subject disclosure.

As best illustrated in FIGS. 2-3 and 10, a pair of cams 90 are each positioned in one of the openings 56 of the central body 44 and constrained axially by the upper and lower ends 58, 60 of the opening 56. The cams 90 are arranged to move radially between a retracted position (shown in FIGS. 2 and 12) and an extended position (shown in FIGS. 3 and 13) in response to engagement by the wedge 78 of the driver 72 during axial movement of the driver 72 toward the head region 50. Such movement of the cams 90 to the expanded position causes the cams 90 to engage the workpieces 22 in the pilot hole 25, therefore eliminating any gap between the locating pin 20 and pilot holes 25. On the other hand, when the cams 90 are in the retracted position, a gap is provided between in the cams 90 and the workpieces 22 to allow the workpieces 22 to easily be positioned on, or removed from the locating pin 20. As best illustrated in FIG. 10, each of the cams 90 extends axially between a lower portion 99 and an upper portion 101. Furthermore, each of the cams 90 has a box portion 92 and an arcuate portion 94, with the arcuate portion 94 positioned perpendicularly to the box portion 92. The box portion 92 has an inner face 96 presenting an axially extending protrusion 97 for being received by the slot 88 of one of the upper and lower faces 82, 84 of the wedge 78 for guiding the wedge 78 axially during axial movement of the driver 72 relative to the cams 90. The arcuate portion 94 has an inside face 103 being generally planar and an outside face 105 generally having an arc shape. The inside face 103 tapers inwardly as it extends axially between the upper portion 101 and the lower portion 99. Furthermore, the inside face 104 engages one of the side faces 86 of the wedge 78 to provide radial outward movement of the cam 90 as the wedge 78 is moved axially toward the head 50. It should be appreciated that the angle of the wedge 89 and inside face 104 of the cam 90 may be adjusted to provide a desired amount of radial movement of the cam 90. It should also be appreciated that a single cam 90, or more than two cams 90 could be utilized.

As best illustrated in FIGS. 2-3 and 10-11, a generally washer-shaped driver retainer 98 is secured to the bottom flange 74 of the driver 72. The driver retainer 98 defines a plurality of securement holes 100 for being attached to an air cylinder or other actuating device to drive the driver 72 axially forward to bias the cams 90 outwardly in their extended positions, or inwardly into their retracted positions.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A locating pin for positioning at least one workpiece on a mounting member including:
a pair of cams being radially moveable between an extended position and a retracted position, wherein the cams are moveable in opposite directions relative to one another between the extended and retracted positions such that the pair of cams engage the at least one workpiece while in the extended position to hold the at least one workpiece in place, and such that the pair of cams are spaced from the at least one workpiece while in the retracted position to allow the at least one workpiece to be positioned on, or removed from the locating pin;
a driver extending along an axis and located radially inwardly of the pair of cams and including a wedge portion in axial alignment with the pair of cams, wherein the wedge portion tapers radially inwardly such that axial movement of the driver provides the radial movement of the pair of cams between the extended and retracted positions;
wherein the wedge portion of the driver defines a pair of first guiding elements, and wherein the pair of cams each present at least one second guiding element in engagement with one of the first guiding elements for guiding the wedge portion as it axially moves relative to the pair of cams;
a central body presenting an outer wall and defining a channel extending axially, wherein the outer wall defines at least one opening into the channel, wherein the pair of cams are positioned in the at least one opening of the outer wall and are radially moveable relative to the outer wall, and wherein the driver is received by the channel and is axially moveable within the channel; and
a net member that extends about and along the axis and includes a shaft portion generally having a tube shape and an outer flange portion extending radially outwardly from the shaft portion for engaging the mounting member, and wherein the net member defines a hollow extending therethrough, and wherein the central body is received by the hollow;
wherein a body retainer underlies the outer flange portion of the net member;
wherein a backing plate underlies the body retainer.

2. The locating pin as set forth in claim 1 wherein the at least one opening includes a pair of openings on circumferentially opposite sides of the central body from one another, and wherein the pair of cams are each positioned in one of the pair of openings.

3. The locating pin as set forth in claim 2 wherein the central body extends axially from a base region to an intermediate region to a head region, wherein the head region tapers inwardly to a tip for guiding the central body into a hole in the at least one workpiece and wherein the pair of openings are defined by the intermediate region beneath the head region.

4. The locating pin as set forth in claim 3 wherein the base region of the central body includes a flange extending radially outwardly beneath the intermediate region.

5. The locating pin as set forth in claim 1 wherein the pair of first guiding elements of the wedge portion of the driver each include at least one slot extending axially, and wherein the at least one second guiding element of the pair of cams are protrusions extending axially and received by the slots of the wedge portion for guiding the wedge portion as the wedge portion axially moves relative to the pair of cams.

6. The locating pin as set forth in claim 1 wherein the outer flange portion of the net member, the body retainer and the backing plate together define a plurality of securement passages extending axially therethrough each for receiving a fastener for securing the outer flange portion, the body retainer and the backing plate to one another and for securing the locating pin to the mounting member.

7. A locating pin for positioning at least one workpiece on a mounting member, the locating pin comprising:
a central body extending axially between a base region an intermediate region and a head region;
the intermediate region of the central body defining a pair of openings on circumferentially opposite sides of the central body;
the head region tapering inwardly to a tip for being received by a hole in the at least one workpiece;
a channel defined by the central body and extending axially through the base region the intermediate region and the head region and terminating prior to the tip;
a driver slidingly received by the channel of the central body, the driver extending axially between a bottom flange and a wedge portion; and
a pair of cams each positioned in one of the openings of the central body for being biased outwardly in opposite directions relative to one another into an extended position by the wedge portion during axial movement of the driver such that the pair of cams extend radially outwardly into engagement with the at least one workpiece for securing the locating pin to the at least one workpiece;
wherein the wedge portion of the driver defines a pair of first guiding elements, and wherein the pair of cams presents each present at least one second guiding element in engagement with one of the first guiding elements for guiding the wedge portion as the wedge portion axially moves relative to the pair of cams.

8. The locating pin as set forth in claim 7 wherein the pair of first guiding elements includes a pair of slots extending axially, and wherein the second guiding elements includes a pair of protrusions extending axially and each received by one of the pair of slots of the wedge for guiding the wedge as it axially moves relative to the pair of cams.

9. The locating pin as set forth in claim 7 further including a net member that extends about and along the axis and includes a shaft portion generally having a tube shape and an outer flange portion extending radially outwardly from the shaft portion for engaging the mounting member, and wherein the net member defines a hollow extending therethrough, and wherein the central body is received by the hollow.

10. The locating pin as set forth in claim 9 wherein the base region of the central body includes a flange extending radially outwardly beneath the intermediate region.

11. The locating pin as set forth in claim 10 wherein a body retainer underlies the outer flange portion of the net member.

12. The locating pin as set forth in claim 11 wherein a backing plate underlies the body retainer.

13. The locating pin as set forth in claim 12 wherein the outer flange portion of the net member, the body retainer and the backing plate together define a plurality of securement passages extending axially therethrough each for receiving a fastener for securing the outer flange portion, the body retainer and the backing plate to one another and for securing the locating pin to the mounting member.

14. The locating pin as set forth in claim 13 wherein the body retainer is disposed annularly about the flange of the base region of the central body.

\* \* \* \* \*